W. B. Wait,
Feed Bag,

N° 41,346. Patented Jan. 19, 1864.

Witnesses:
R. P. Hale Jr.
Frederick Curtis

Inventor:
Windsor B. Wait
by his attorney
R. H. Eddy

UNITED STATES PATENT OFFICE.

WINDSOR B. WAIT, OF GREENWOOD, ASSIGNOR TO HIMSELF AND JOSEPH A. FAIRBANKS, OF MELROSE, MASSACHUSETTS.

IMPROVEMENT IN FEED-BAGS.

Specification forming part of Letters Patent No. 41,346, dated January 19, 1864.

*To all whom it may concern:*

Be it known that I, WINDSOR BRUCE WAIT, a resident of Greenwood, in the county of Middlesex and State of Massachusetts, have invented an Improved Nose-Bag to be Used in Feeding a Horse or other Animal; and I do hereby declare the same to be fully described in the following specification and represented in the accompanying drawings, of which—

Figure 1:
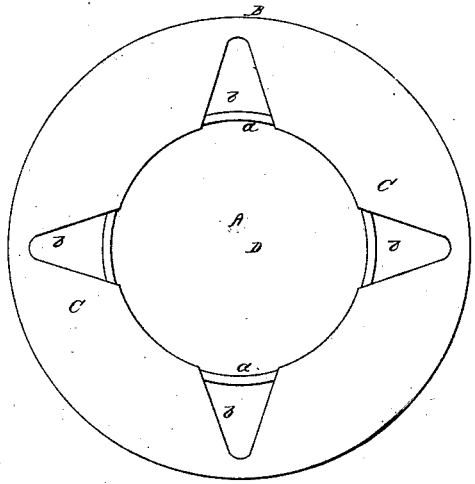
Figure 2:
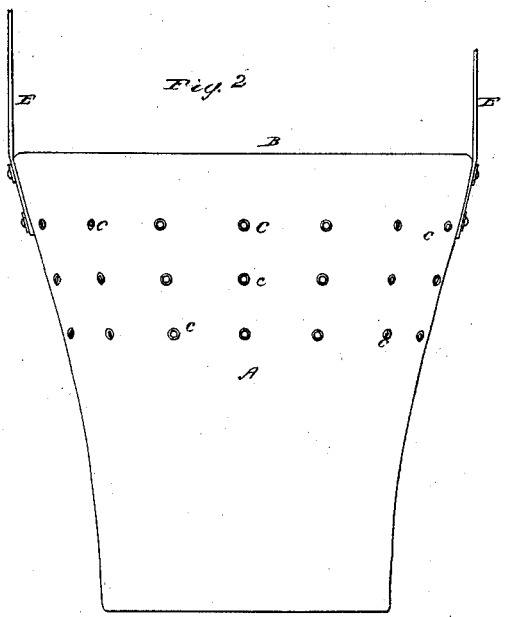
Figure 3:
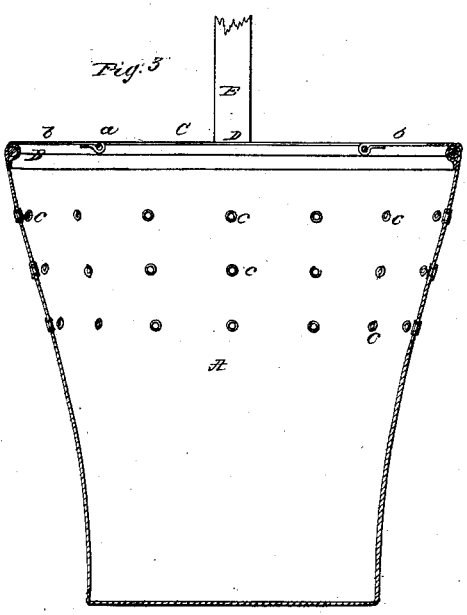

Figure 1 denotes a top view, Fig. 2 a vertical section, and Fig. 3 an elevation, of it.

My invention may be considered as an improvement on that for which Letters Patent No. 37,262 were granted to me and Joseph A. Fairbanks on the 23d day of December, of the year 1862, the invention covered by the said patent having been made by me and assigned to myself and the said Fairbanks.

The nature of my present invention consists in an improved nose-bag or horse-feeder as constructed not only with ventilating-openings in its head-cap, but with a series of air-induction holes or openings arranged in its sides or body and below the head-cap openings; and my invention further consists in the feed-bag or feeder as made with the head-cap, the dependent bag, and the supporting-annulus thereof, so constructed or of such material or materials as to be capable of being folded, as circumstances may require, and also when unfolded it shall possess sufficient rigidity to keep the cap properly stretched.

The nose-bag heretofore invented and patented by me, and on which my present invention is based, had a series of air-inlets arranged in its cap, they being for the twofold purpose of permitting the increase of fresh air into and the ejecting the heated air from the bag. In my improved nose-bag or horse-feeder the said openings in the cap are intended only as air-exhaust openings, as I arrange below them and in the sides of the body of the bag another or several rows of very small openings, such as will permit the influx of air into the bag as it may be required for the respiratory organs of a horse or animal while feeding from the bag, the exhaled air from such organs being driven out of the bag through the openings of its cap. In this way it has been found that a much better and more natural ventilation of the bag can be effected than with the openings of the cap alone. The lateral openings of the body of the bag are to be arranged above that part of the bag which is to hold the grain, and should be of a size to prevent any material exit or loss of grain through them when the bag may be shaken or thrown off by the horse, these openings also being in number sufficient for a due supply of air to the lungs of the animal. When the bag is made of canvas or other analogous material, each of the induction-openings may be formed by a metallic eyelet let into the bag.

In the drawings, A denotes the body of the bag, which depends from a hoop or annulus, B, which in my improved bag I make of rope, instead of having it a metallic or inflexible hoop, the rope, while having sufficient stiffness to keep the cap of the bag distended, being capable of being folded on itself, or of enabling the cap to be folded in line of its diameter, and with one-half on the other, as circumstances may require, either for convenient packing or transportation of the nose-bag, or for any other purpose. The head-cap C is a flat annulus of cloth, leather, or some other suitable material having a proper degree of flexibility. It has an opening or mouth, D, which is bounded by an elastic hoop, belt, or band, *a*, and, furthermore, it has four or any other suitable number of air-exhaust passages, *b b b b*, made through it and next to the mouth and its elastic band, in manner as shown in Fig. 1, they being so arranged as to permit the expansion of the elastic band, and consequently that of the mouth of the bag, as circumstances may require.

The hanger or head-strap, by which the bag is suspended from the head or neck of a horse, is shown at E.

The ventilating-openings or air-induction passages of the body of the bag are represented at *c c c c*, they being arranged in parallel rows or in any other suitable manner.

I claim—

1. My improved nose-bag or horse-feeder as made with the ventilating-openings *b b b b* in its head-cap, and with a series of air-induction holes or openings, *c c c c*, arranged in its sides or body and below the head-cap openings, as specified.

2. The improved nose-bag or horse-feeder as made with the head-cap, the dependent bag, and the supporting-annulus D, so constructed or of such material or materials as to be capable of being folded as circumstances may require, and also when unfolded to possess sufficient rigidity to keep the cap properly distended for use on or about the head of a horse or other animal to which it may be applied.

W. B. WAIT.

Witnesses:
   R. H. EDDY,
   F. P. HALE, Jr.